Nov. 10, 1970   R. W. GILMAN   3,538,546
ADJUSTABLE FEED DEFLECTOR
Original Filed May 19, 1967                                     2 Sheets-Sheet 1
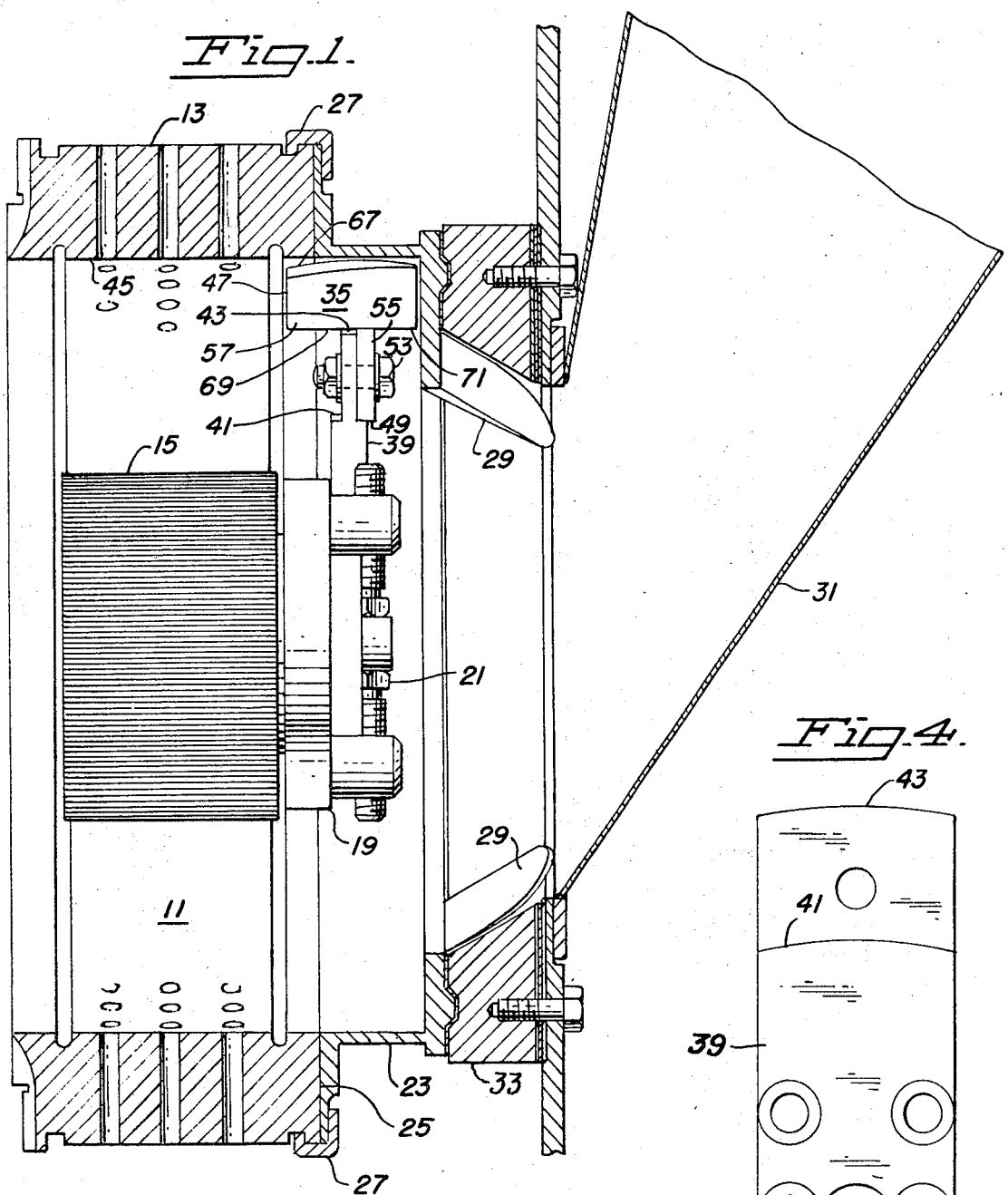
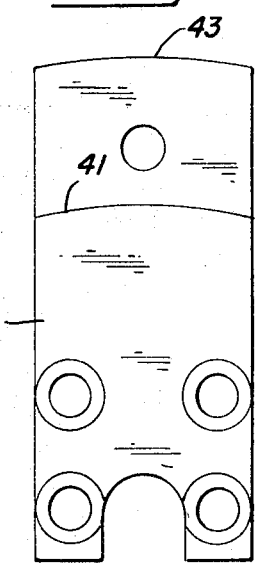
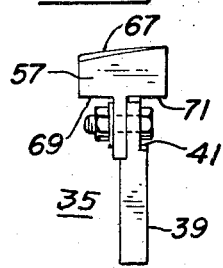
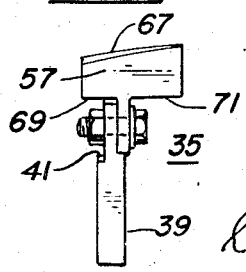
INVENTOR
ROBERT W. GILMAN
BY
Charles O. Bruce
ATTORNEY

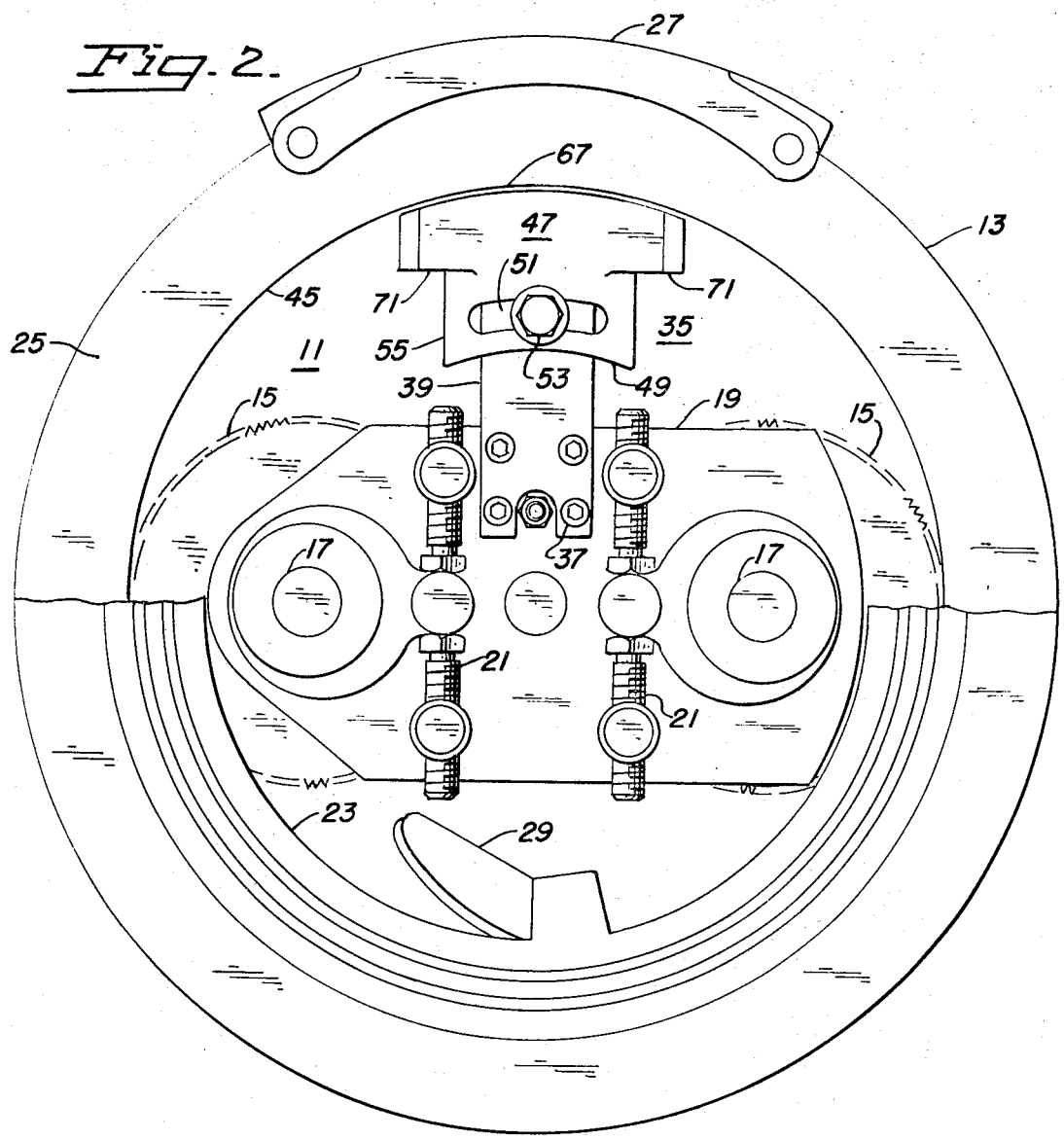
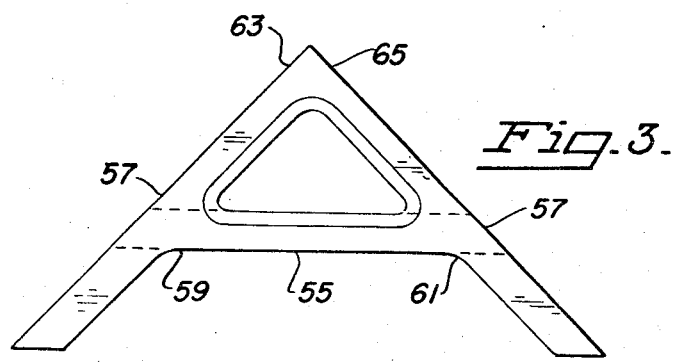

United States Patent Office 3,538,546
Patented Nov. 10, 1970

3,538,546
ADJUSTABLE FEED DEFLECTOR
Robert W. Gilman, San Francisco, Calif., assignor to California Pellet Mill Company, San Francisco, Calif., a corporation of California
Continuation of application Ser. No. 639,869, May 19, 1967. This application Sept. 25, 1969, Ser. No. 861,205
Int. Cl. B29f 3/012
U.S. Cl. 18—12                                  14 Claims

ABSTRACT OF THE DISCLOSURE

A pair of angled deflector faces are adjustably secured to a pellet mill to deflect feed material into the extrusion rolls thereof in a controllable deposition pattern.

---

This application is a continuation of Ser. No. 639,869, filed May 19, 1967, now abandoned.

BACKGROUND OF THE INVENTION

The present invention relates to feed deflectors for pellet mills. More particularly, it relates to an adjustable feed deflector for a pellet mill having a radially perforated annular die.

There are many types of die configurations presently used in the art of pellet processing. The types of pellet mills to which the present invention relates are those utilizing radially perforated annular dies wherein the extrusion die is driven and rotates around fixed position extrusion rollers, or the die is floating and rotates on driven fixed position rollers, or the die is fixed and the rollers rotate around the internal surface thereof.

When a pellet mill has an annular die mounted in a vertical orientation, whereby the cylindrical axis of the die is parallel to the ground, there is a problem associated with the feeding of these mills which results in a non-uniform product. The problem is caused by an uneven distribution of the feed material across the working surface of the die and/or the extrusion rollers.

Dies of pellet mills are generally fed by a hopper attached to or supported on one side thereof. By feeding from only one side of the die, the raw feed material generally collects or loads one portion of the die. This must be eliminated to correct the problem of non-uniform extrusion. The problem is further aggravated because pellet mills are usually provided with feeders for digging or scraping the feed material out of the adjacent hoppers and propelling it into the extrusion assembly. This generally has the effect of irregularly loading the feed material on the edge of the die furthest removed from the feed hopper.

Many means have been tried to effect a solution to the problem. The most successful comprises providing feed deflectors which scrape the feed material into the path of the extrusion rollers. If the mill is the type in which the die rotates around the rollers, the deflectors are secured to the frame of the pellet mill. If the die is of the fixed variety, the deflectors are arranged to rotate around the internal surface of the die. The feed deflectors have the effect of providing a uniform distribution of the raw material across the face of the die and/or the extrusion rollers to permit the uniform processing of material through the die.

In the prior art, the feed deflectors have been made relatively inflexible whereby the relationship of the scraper with respect to the die is substantially unadjustable. Any position adjustment of the deflector must usually be effected by bending the deflector. Examples of these type deflectors are disclosed in U.S. Pat. No. 2,798,444 to Meakin and U.S. Pat. No. 3,167,813 to Keefe.

The main objection to these is due to their inflexibility because they cannot be adjusted to compensate for changes in the characteristics of the feed mixture or a change in the rate of processing. A change in feed mixture often results in changes of density or feed material consistency resulting in a consequential change to the pattern of deposition of the feed material onto the working surface of the die and/or the extrusion rollers. Likewise a change in speed of operation of the mill affects the deposition pattern of the feed material on the die and rollers. It is necessary to provide means for adjusting the deflectors to be able to accommodate these changes. An example of an adjustable feed deflector is disclosed in U.S. Pat. No. 2,908,038 to Meakin. A more versatile and completely adjustable feed deflector is required than has heretofore been known.

Another problem which has arisen in the prior art is the fact that the feed deflectors have not heretofore been made to accommodate both clockwise and counter-clockwise rotation of the extrusion assembly.

Applicant's invention provides a feed deflector which is effective for either clockwise or counterclockwise rotation of the extrusion assembly. More importantly, it is an adjustable feed deflector having a wide range of adjustment for changing the deposition pattern of the feed material across the face of the die and the extrusion rollers. It permits the pellet mill to handle a wide variety of raw feed materials over a large range of extrusion rates.

SUMMARY OF THE INVENTION

The present invention is an adjustable feed deflector for a pellet mill and comprises: a base portion; securing means for attaching the base portion to a pellet mill; and a head portion adjustably secured to the base portion whereby the head portion can be arranged in variable positions with respect to the base portion and includes a pair of deflector faces on the head portion angled with respect to each other.

It is therefore an object of the present invention to provide a feed deflector for a pellet mill which can be used in pellet mills having either rotating or fixed dies.

It is another object of the present invention to provide a feed deflector which can be used in a pellet mill having extrusion assemblies capable of clockwise and/or counter-clockwise rotation.

It is a further object of the present invention to provide an adjustable feed deflector having a wide range of adjustment for changing the area of deposition of the feed material on to the working surface of the die and the extrusion rollers.

And yet another object of the present invention is to provide an adjustable feed deflector for a pellet mill which can be easily and simply adjusted.

DESCRIPTION OF THE DRAWINGS

FIG. 1 is a side elevation in section of the extrusion assembly of a pellet mill showing the present invention mounted therein in side elevation;

FIG. 2 is a front elevation of the extrusion assembly partly broken away and showing the present invention in rear elevation;

FIG. 3 is a plan view of the head portion of the present invention;

FIG. 4 is a front elevation of the base portion of the present invention;

FIG. 5 is a side elevation of the present invention removed from the pellet mill;

FIG. 6 is a side elevation of the present invention removed from the pellet mill having the head portion secured to the opposite side of the base portion with respect to that of FIG. 5.

DESCRIPTION OF THE PREFERRED EMBODIMENT

Reference is made to FIGS. 1 and 2 for consideration of the environment within which the present invention operates. There shown is the extrusion assembly 11 of a pellet mill which comprises in part a radially perforated annular extrusion die 13. In the described embodiment, the pellet mill extrusion die is of the rotating type whereby it is driven around the extrusion rollers 15. The rollers are fixed in location and rotate on eccentrically journalled shafts 17 supported from the frame of the extrusion mill. A retaining plate 19 holds the extrusion rollers and the shafts within the extrusion die. Adjustment means 21 are provided for adjusting the radial position of the extrusion rollers within the extrusion die. As the eccentrically journalled shafts 17 are turned, the radial position of the rollers is altered and thereby the outward pressure they exert on the die is adjustable.

A rotating cone 23 is secured to the forward face 25 of the die by a cone clamp 27. The cone is provided with a pair of finger scrapers, or feeders, 29 which project into the feed chute 31 of the pellet mill. The feed chute is positioned in front of the die with the discharge end 33 thereof, formed by a stationary cone, disposed adjacent and opening into the extrusion assembly. The chute 31 is supported by the feed mill and seals with the rotating cone 23. The feeders 29 rotate with the die 13 to dig the raw feed material out of the feed chute 31 and pull it into the extrusion assembly 11.

The feed deflector 35 of the present invention is secured to the extrusion roller retaining plate 19 by means of bolts 37. In pellet mills in which the extrusion rollers rotate around the internal surface of the die, the same relative structural position of the feed deflector in the extrusion assembly would obtain.

The feed deflector includes a base portion 39 which has a pair of aligned shoulders 41 spaced from the end 43 of the base portion on opposite sides thereof. By use of the term aligned, it is meant that the shoulders 41 are disposed at the same location on the base plate on the opposite sides thereof whereby the distance from the shoulders to an end of the plate is the same for both shoulders. The shoulders are of arcuate configuration and are formed to parallel the inner annular surface 45 of the die 13 and the rotating cone 23 when the deflector is secured in the working position. The outer or upper end 43 of the base portion likewise has an arcuate configuration which parallels the inner annular surface of the die and rotating cone when the deflector is placed in operating position. It will be noticed that the radius of generation of the upper end is greater than that of the shoulders.

A head portion 47 is adjustably secured to one side of the base portion with the lower end 49 thereof abutting and slidable along one of the shoulders 41. The adjustable securement of the head portion to the base portion is achieved by means of an arcuate slot 51 formed in the head portion parallel the shoulders 41 of the base portion. A bolt 53 extends through the slot and engages with the base portion 39.

The head portion includes a plate portion 55 which has the lower end 49 thereof formed with an arcuate surface which abuts with and mates with the shoulders of the base portion. The head portion is securable to either side of the base portion in view of the base portion being constructed with aligned shoulders. The abutting arcuate surfaces formed on the head and base portions permit the head portion 47 to be adjusted with respect to the base portion 39 for changing the relationship therebetween and yet provide solid abutting seating surfaces for alignment of the head portion within the annular die and rotating cone.

A pair of deflector faces 57 formed on the head portion are angled with respect to each other. The deflector faces are formed by two plate portions secured intermediate their ends to opposite edges 59, 61 of the plate portion 55 of the head portion. The deflector faces are interconnected at their respective ends 63, 65 and have an angle of approximately 90° with respect to each other. However, this angle can vary and is not critical to the invention. The upper end 67 of the head portion has an arcuate configuration which conforms closely to the inner annular surface 45 of the die and rotating cone. During operation, the upper end of the deflector is disposed proximate thereto.

The upper end 43 of the base portion abuts the lower edges 69, 71 of the deflector faces and provides additional rigidity and support to the head portion.

The arcuate formation of the abutting surfaces of the head and base portions, the shoulders 41 on the base portion, and the lower end 49 of the plate portion of the head portion effect a set of guide means. As the adjustable securing means is loosened and the head portion is moved with respect to the base portion, the deflector faces track an arcuate path with respect to the die and rotating cone because of the guide means and do not touch or interfere with the internal surfaces of either the die or the rotating cone; they rotate with respect to the base portion and maintain their spaced relationship therefrom.

In operation, the present invention provides a feed deflector which scrapes both the feed material being fed into the pellet mill by means of the feeders, and the feed material clinging to the rotating cone and the extrusion die, into uniformly distributed pattern on the inner annular wall or working surface of the die. The feeders also accelerate feed material into the die at the bottom. As the rate of processing or the characteristics of the feed material are changed, the feed deflector can be adjusted to deflect the feed material to the proper location within the extrusion assembly for uniform extrusion. This is done by loosening the adjusting bolt 53 and sliding the head portion clockwise or counterclockwise to alter the position of the deflector faces.

A unique feature of the present invention is the fact that the feed deflector has an extended range of adjustment. When the head portion of the feed deflector has been moved through the complete range of adjustment provided by the arcuate slot, while the head portion is secured to the base plate on one side thereof, the head portion can then be taken off and shifted to the other side of the base plate for another complete range of operation (see FIGS. 5 and 6). The thickness of the base portion 39 and the length of the arcuate slot 51 are selected to coordinate so that the range of adjustment overlaps slightly as the head portion is switched from one side of the base plate to the other whereby the extended range of adjustment is achieved.

A further unique feature of the present invention is the double deflector faces 57 which permit the machine to be operated either clockwise or counterclockwise, and which, in conjunction with the complete ranges of adjustment of the feed deflectors, permit a completely versatile adjustment for changing the deposition of the feed material on the extrusion die and rollers.

It will be apparent from the foregoing description of the invention, in its preferred form, that it will fulfill all the objects attributable thereto. While it has been illustrated and described in considerable detail, the invention is not to be limited to such details as have been set forth except as may be necessitated by the appended claims.

I claim:
1. An adjustable feed deflector for a pellet mill comprising
   a head portion having a pair of deflector faces angled with respect to each other whereby said faces would intersect if they were extended, and
   means for adjustably securing said head portion to the pellet mill whereby said deflector faces are maintained at a constant distance from the inner surface of said die and can be adjustably positioned with respect thereto.

2. The feed deflector of claim 1 wherein said head portion includes a plate portion and said deflector faces are interconnected at their respective ends and are secured to opposite edges of said plate portion intermediate their ends.

3. The feed deflector of claim 1 wherein the top surfaces of the deflector faces which are positioned proximate the inner surface of the annular die are shaped to conform to said surface.

4. The feed deflector of claim 1 including a base portion having securing means for attaching said base portion to the pellet mill, and said head portion is adjustably secured to said base portion.

5. The feed deflector of claim 4 wherein the base portion has an arcuate surface abutting a mating arcuate surface formed on said head portion, said abutting surfaces forming seating surfaces along which the head portion may be moved with respect to said base portion for changing the relationship therebetween.

6. The feed deflector of claim 5 wherein the arcuate surface on said base portion is a shoulder and the arcuate portion on said head portion is the lower edge thereof.

7. The feed deflector of claim 6 wherein said base portion includes a pair of aligned arcuate shoulders on opposite sides of said base portion.

8. The feed deflector of claim 7 wherein the lower end of said head portion and the shoulders of said base portion have mating arcuate configurations and said head portion can be secured to either side of said base portion.

9. The feed deflector of claim 7 wherein the adjustable securing means includes a slot in said head portion formed parallel the lower end of said head portion and bolt means extends through the slot and engages the base portion for securing said head and base portions together.

10. In a pellet mill having a generally annular die, an adjustable feed deflector comprising,
 a base portion having securing means for attaching said base portion to the pellet mill, and
 a head portion having a pair of deflector faces which are generally acutely angled with respect to each other and interconnect at the respective ends thereof, said deflector faces being secured to opposite edges of a plate portion intermediate their ends and having their top surfaces shaped to conform to the inner surface of the annular die, said plate portion being adjustably secured to said base portion to maintain said deflector faces at a constant distance form the inner annular surface of said die.

11. In a pellet mill having a generally annular die, an adjustable feed deflector comprising
 a base portion having an arcuate surface,
 securing means for attaching said base portion to said pellet mill with said arcuate surface concentric to said annular die,
 a head portion having an arcuate surface mating with and abutting the arcuate surface formed on said base portion, said head portion being adjustably secured to said base portion by means of an arcuate slot formed in said base whereby said head portion can be arranged at variable positions with respect to the base portion within the annular die at a constant distance from the inner surface thereof at variable positions therealong,
 at least one deflector face on said head portion disposed in spaced relation from the inner surface of said annular die when said head portion is secured to said base portion and said base portion is secured to said pellet mill, said deflector face maintaining a constant spaced relation from said die as said head portion is moved with respect to said base portion and said abutting arcuate surfaces are in contact.

12. The feed deflector of claim 11 wherein the base portion includes a pair of shoulders on opposite sides thereof and the head portion includes a plate portion which secures to said loose portion,
 the lower end of said plate portion and the shoulders of said base portion having mating arcuate configurations and said plate portion being securable to either side of said base portion.

13. In a pellet mill having a radially perforated annular die, an adjustable feed deflector comprising
 a base portion having a pair of aligned arcuate shoulders formed on opposite sides of said base portion in spaced relation to the ends thereof, said shoulders having a shorter radius of generation than the inner annular surface of said die,
 means for securing said base portion to said pellet mill with said arcuate shoulders concentric to the inner annular surface of said die,
 a head portion having a plate portion with a lower end thereof being adjustably secured to one side of said base portion by means of an arcuate slot formed parallel said shoulders and a bolt extending through said slot and engaging said base portion, said plate portion being securable to either side of said base portion and having an arcuate surface abutting and mating with the shoulder of said base portion on the side of the base portion to which the plate portion is attached whereby said head portion can be adjustably positioned with respect to said base portion, and
 a pair of deflector faces secured to opposite edges of said plate portion intermediate their ends and interconnected at their respective ends, said deflector faces having an angle of approximately 90° with respect to each other and disposed proximate to the inner annular surface of said die, the adjustable securement of said head portion to said base portion permitting said deflector faces to be positioned a constant distance from the inner surface of said die at variable positions therealong.

14. The feed deflector of claim 13, wherein the top surfaces of said deflector faces which are positioned proximate the inner surface of the annular die are shaped to conform to said surface.

References Cited
UNITED STATES PATENTS

| | | | |
|---|---|---|---|
| 2,798,444 | 7/1957 | Meakin | 18—12 X |
| 2,908,038 | 10/1959 | Meakin | 18—12 |
| 3,167,813 | 2/1965 | Keefe | 18—12 |
| 3,191,227 | 6/1965 | Keefe | 18—12 |
| 3,280,426 | 10/1966 | Meakin | 18—12 |

WILBUR L. McBAY, Primary Examiner